United States Patent
Mishra et al.

(10) Patent No.: US 12,212,426 B1
(45) Date of Patent: Jan. 28, 2025

(54) SYSTEMS AND METHODS FOR SUPPORTING MIXED IGMP QUERIER VERSIONS

(71) Applicant: Cisco Technology, Inc., San Jose, CA (US)

(72) Inventors: Mankamana Prasad Mishra, San Jose, CA (US); Sridhar Santhanam, Dublin, CA (US); Luc Andre Burdet, Quebec (CA); Prasad Sreedharan Nair, Livermore, CA (US); Dhananjaya Kasargod Rao, Sunnyvale, CA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 347 days.

(21) Appl. No.: 17/706,833

(22) Filed: Mar. 29, 2022

(51) Int. Cl.
| | |
|---|---|
| *H04L 29/06* | (2006.01) |
| *H04B 7/155* | (2006.01) |
| *H04L 1/00* | (2006.01) |
| *H04L 9/40* | (2022.01) |
| *H04L 12/18* | (2006.01) |
| *H04L 43/028* | (2022.01) |

(52) U.S. Cl.
CPC .......... *H04L 12/185* (2013.01); *H04L 43/028* (2013.01); *H04L 63/0272* (2013.01); *H04L 63/0281* (2013.01)

(58) Field of Classification Search
CPC ... H04L 12/18; H04L 43/028; H04L 12/1836; H04L 1/00; H04L 63/0272; H04L 63/0281; H04L 12/185; H04L 12/189; H04L 2201/00; H04B 7/155

USPC ........................................................ 370/390
See application file for complete search history.

(56) References Cited

U.S. PATENT DOCUMENTS

| | | | | |
|---|---|---|---|---|
| 9,729,337 | B2 * | 8/2017 | Janakiraman | .......... H04B 7/155 |
| 10,432,757 | B1 * | 10/2019 | Sajassi | ................ H04L 12/4633 |
| 10,999,195 | B1 * | 5/2021 | Suryanarayana | ....... H04L 45/64 |
| 2017/0295093 | A1 * | 10/2017 | Moreno | .............. H04L 12/4641 |

(Continued)

FOREIGN PATENT DOCUMENTS

CN  101483655 A  *  7/2009

OTHER PUBLICATIONS

Huawei, "IGMP Snooping over EVPN MPLS", New IP Technologies, Jan. 13, 2021 (Year: 2021).*

(Continued)

*Primary Examiner* — Edan Orgad
*Assistant Examiner* — Vanneilian Lalchinthang
(74) *Attorney, Agent, or Firm* — Baker Botts L.L.P.

(57) ABSTRACT

According to some embodiments, an Ethernet Virtual Private Network (EVPN) includes a first router configured as an Internet Group Management Protocol (IGMP) version 3 querier and a second router configured as an IGMP version 2 querier. The second router is configured to receive a Selective Multicast Ethernet (SMET) route message generated by the first router. The SMET route message includes an IGMP version 3 join request from a receiver, and the IGMP version 3 join request includes an address of a multicast source device. The second router is further configured to convert the IGMP version 3 join request of the SMET route message to an IGMP version 2 join request. The second router is further configured to send multicast traffic from the multicast source device to the receiver via the first router.

20 Claims, 3 Drawing Sheets

(56) References Cited

U.S. PATENT DOCUMENTS

| | | | |
|---|---|---|---|
| 2018/0034648 A1* | 2/2018 | Nagarajan | H04L 69/14 |
| 2021/0099400 A1* | 4/2021 | Elizabeth | H04L 45/66 |
| 2022/0210059 A1* | 6/2022 | Brar | H04L 12/1886 |
| 2022/0417059 A1* | 12/2022 | Nalagatla | H04L 12/1877 |
| 2022/0417907 A1* | 12/2022 | Xiong | H04W 72/30 |

OTHER PUBLICATIONS

Huawei, "IGMP Snooping over EVPN MPLS", New IP Technologies, Jan. 13, 2021.

* cited by examiner

SYSTEMS AND METHODS FOR SUPPORTING MIXED IGMP QUERIER VERSIONS

TECHNICAL FIELD

This disclosure generally relates to Internet Group Management Protocol (IGMP), and more specifically to systems and methods for supporting mixed IGMP querier versions.

BACKGROUND

An Ethernet Virtual Private Network (EVPN) is a network technology for carrying layer 2 Ethernet traffic as a virtual private network using wide area network protocols. The Internet Group Management Protocol (IGMP) is a communications protocol used by network devices (e.g., routers) to establish multicast group memberships and allows networks such as EVPNs to deliver multicast transmissions from a source to one or more receivers. There are currently three versions of IGMP: IGMPv1 (defined by RFC 1112), IGMPv2 (defined by RFC 2236), and IGMPv3 (defined by RFC 3376). Generally, network devices such as routers that are configured as IGMPv2 devices are not able to process requests for multicast transmissions from other network devices that are configured as IGMPv3 devices. More specifically, IGMP queries are local to hosts behind each EVPN leaf and IGMP queries are not flooded into the EVPN fabric. In order to maintain IGMP membership reports, each leaf of the EVPN should have a local querier. However, IGMPv2 queriers are not be able to process IGMPv3 membership reports. In some scenarios such as when a source node in the EVPN fabric is a IGMPv2 querier and a receiver node is a IGMPv3 querier, multicast transmission will not be possible from the source to the receiver.

BRIEF DESCRIPTION OF THE DRAWINGS

For a more complete understanding of the disclosed embodiments and their features and advantages, reference is now made to the following description, taken in conjunction with the accompanying drawings, in which.

DESCRIPTION OF EXAMPLE EMBODIMENTS

Overview

The present disclosure relates generally to providing the ability to have mixed Internet Group Management Protocol (IGMP) querier versions in a network such as an Ethernet Virtual Private Network (EVPN). EVPN is a network technology for carrying layer 2 Ethernet traffic as a virtual private network using wide area network protocols. IGMP is a communications protocol used by network devices (e.g., routers) to establish multicast group memberships and allows networks such as EVPNs to deliver multicast transmissions from a source to one or more receivers. There are currently three versions of IGMP: IGMPv1 (defined by RFC 1112), IGMPv2 (defined by RFC 2236), and IGMPv3 (defined by RFC 3376).

According to some embodiments, an Ethernet Virtual Private Network (EVPN) includes a first router configured as an Internet Group Management Protocol (IGMP) version 3 querier and a second router configured as an IGMP version 2 querier. The second router is configured to receive a Selective Multicast Ethernet (SMET) route message generated by the first router. The SMET route message includes an IGMP version 3 join request from a receiver, and the IGMP version 3 join request includes an address of a multicast source device. The second router is further configured to convert the IGMP version 3 join request of the SMET route message to an IGMP version 2 join request. The second router is further configured to send multicast traffic from the multicast source device to the receiver via the first router.

According to another embodiment, a method performed by a network device in an EVPN includes receiving an IGMP version 3 join request generated by a receiver. The IGMP version 3 join request includes an address of a multicast source device. The method further includes converting the IGMP version 3 join request to an IGMP version 2 join request. The method further includes sending multicast traffic from the multicast source device to the receiver.

Technical advantages of certain embodiments of this disclosure may include one or more of the following. Certain systems and methods described provide network devices such as routers that are configured as IGMPv2 devices to process IGMP join requests from other network devices that are configured as IGMPv3 devices. Unlike existing networks where a first network device that is configured as an IGMPv2 querier is unable to process IGMP join requests from a second network device that is configured as an IGMPv3 querier, embodiments of this disclosure provide an enhanced join handling procedure for IGMPv2 queriers that allows such queriers to convert IGMPv3 join requests to IGMPv2 join requests. By converting IGMPv3 join requests to IGMPv2 join requests by a network device that is configured as an IGMPv2 querier, the IGMPv2 querier device may be able to provide multicast traffic to a receiver that would otherwise not be able to receive the desired multicast traffic. Furthermore, by converting IGMPv3 join requests to IGMPv2 join requests by a network device that is configured as an IGMPv2 querier, network bandwidth and computer resources (e.g., computer memory and processing power) may be optimized by not having to process a dropped route that would otherwise occur in current networks. Other technical advantages will be readily apparent to one skilled in the art from the following figures, descriptions, and claims. Moreover, while specific advantages have been enumerated above, various embodiments may include all, some, or none of the enumerated advantages.

Example Embodiments

The present disclosure relates generally to providing the ability to have mixed IGMP querier versions in a network such as an EVPN. Generally, network devices such as routers that are configured as IGMPv2 devices are not able to process requests for multicast transmissions (e.g., IGMP join requests) from other network devices that are configured as IGMPv3 devices. That is, if an IGMPv2 querier receives an IGMPv3 join request, the IGMPv2 querier will not process the IGMPv3 join request and multicast traffic will not be forwarded to the requesting receiver. More specifically, IGMP queries are local to hosts behind each EVPN leaf and IGMP queries are not flooded into the EVPN fabric. In order to maintain IGMP membership reports, each leaf of the EVPN should have a local querier. However, IGMPv2 queriers are not be able to process IGMPv3 membership reports. In some scenarios such as when a source node in the EVPN fabric is a IGMPv2 querier and a receiver node is a IGMPv3 querier, multicast transmission will not be possible from the source to the receiver.

To address these and other problems with networks that have mixed IGMP querier versions, the enclosed embodiments provide system and methods that allow network devices such as routers that are configured as IGMPv2 queriers to process IGMPv3 join requests. To do so, embodiments of the disclosure provide an enhanced join handling procedure for IGMPv2 queriers that allows such queriers to convert IGMPv3 join requests to IGMPv2 join requests. For example, a router configured as an IGMPv2 querier may receive a Selective Multicast Ethernet (SMET) route message that includes an IGMPv3 join request from a receiver. The IGMPv2 querier device may then convert the IGMPv3 join request of the SMET route message to an IGMPv2 join request. Finally, the IGMPv2 querier may send multicast traffic to the receiver according to the converted IGMPv2 join request. As a result, a receiver behind an IGMPv3 querier may be able to receive multicast traffic from a source behind an IGMPv2 querier where it would otherwise be unable to do so.

Figure 1:
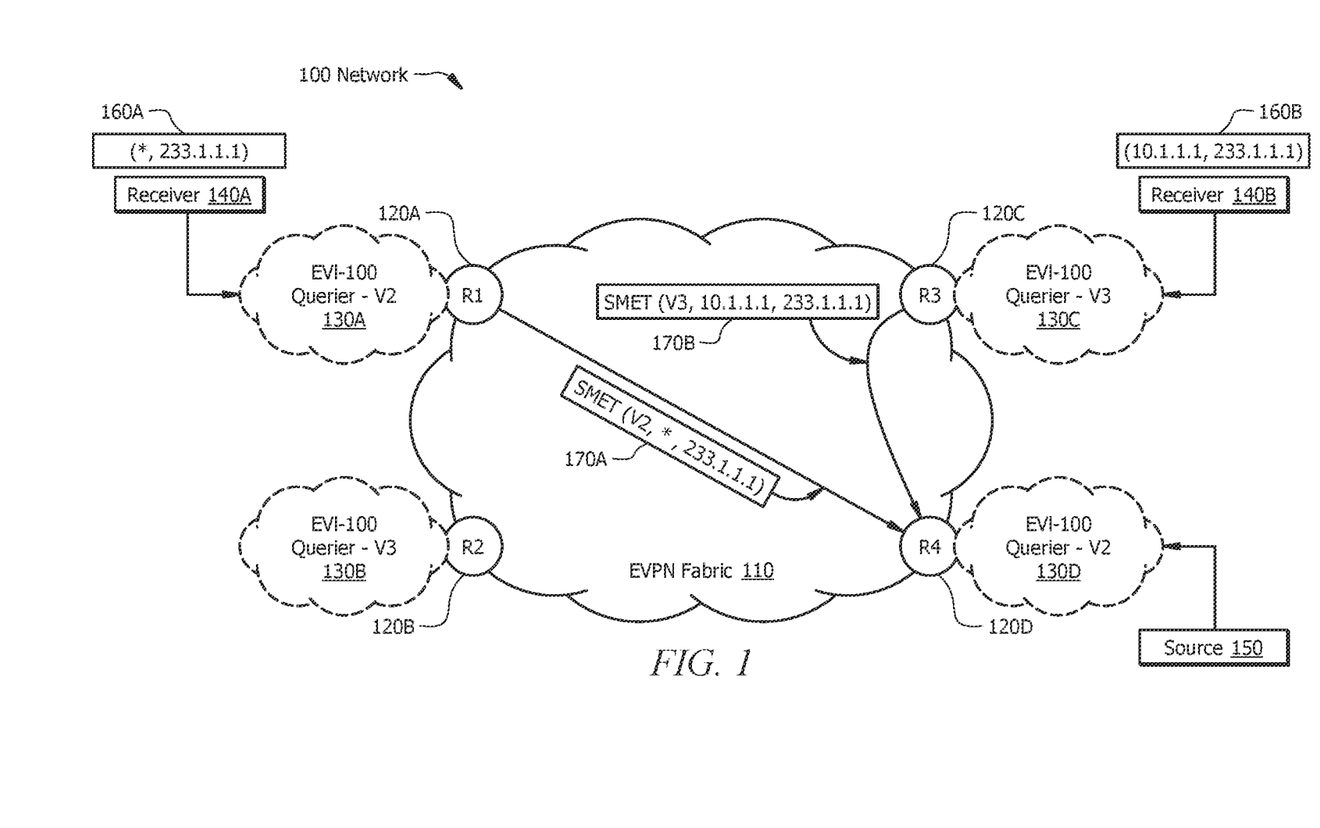
FIG. 1 is network diagram illustrating an Ethernet Virtual Private Network (EVPN) fabric that supports mixed IGMP querier versions, according to some embodiments.

FIG. 1 illustrates a network diagram illustrating a mixed IGMP querier network 100. Mixed IGMP querier network 100 includes an EVPN fabric 110 that includes multiple instances 130. For example, EVPN fabric 110 may include a first instance 130A, a second instance 130B, a third instance 130C, and a fourth instance 130D. Each instance 130 may include a network device 120 (e.g., network devices 120A-D). Network devices 120 are communicatively coupled within EVPN fabric 110 using any appropriate communication protocol.

In general, mixed IGMP querier network 100 permits instances 130 that are IGMPv2 to send multicast traffic to instances 130 that are IGMPv3 where they would typically be unable to do so. More specifically, network devices 120 that are configured as IGMPv2 queriers are modified in order to allow them to process IGMPv3 join requests, thereby enabling IGMPv2 network devices 120 to send multicast traffic to a receiver in an IGMPv3 instance 130. To do so, network devices 120 include an enhanced join handling procedure that converts IGMPv3 join requests to IGMPv2 join requests when the network device 120 is configured as an IGMPv2 querier. For example, network device 120D, which is configured as an IGMPv2 querier in the illustrated example of FIG. 1, may receive a Selective Multicast Ethernet (SMET) route message 170B that includes an IGMPv3 join request 160B from a receiver 140B that wishes to receive multicast traffic from a source 150. Network device 120D may then convert IGMPv3 join request 160B to an IGMPv2 join request. Finally, network device 120D may send multicast traffic from source 150 to receiver 140B according to the converted IGMPv2 join request. As a result, receiver 150 that is located in an IGMPv3 instance 130C may be able to receive multicast traffic from source 150 that is in an IGMPv2 instance 130D where it would otherwise be unable to do so.

In general, instances 130 are physical locations in mixed IGMP querier network 100 where one or more network devices 120 (e.g., an edge router) may reside. For example, a branch office of an enterprise may be an instance 130 of router 110 and may include multiple network devices 120.

Each network device 120 provides an entry point into an enterprise or service provider network. Examples of network devices 120 include routers, routing switches, integrated access devices (IADs), and wide area network (WAN) access devices. Network devices 120 may be either hardware devices or software (e.g., a cloud-based router) that runs as a virtual machine. In FIG. 1, each instance 130 site includes a single network device 120 (i.e., network device 120A in instance 130A, network device 120B in instance 130B, network device 120C in instance 130C, and network device 120D in instance 130D). However, it is to be understood that a given instance 130 may have multiple network devices 120.

In the example of FIG. 1, instances 130A-D are multicast sites and network devices 120A-D are configured with IGMPv2 or IGMPv3 multicast routing. More specifically network devices 120A and 120D (i.e., "R1" and "R4") are configured as IGMPv2 queriers, and network devices 120B and 120C (i.e., "R2" and "R3") are configured as IGMPv3 queriers. Additionally, instance 130A includes a multicast receiver 140A that sits behind network device 120A and instance 130C includes a multicast receiver 140B that sits behind network device 120C. Finally, instance 130D includes a multicast source 150) that is located behind network device 120D.

Join request 160 is an IGMP Membership Report that is generated by a receiver 140. Join request 160 may be an IGMPv2 join request (i.e., a (*, G) request) or an IGMPv3 join request (i.e., a (S, G) request). In both cases, the G represents the multicast address for receiving the multicast stream. The S indicates that the multicast stream is to be received from a particular source, such as an IP address of source 150. The * is a wildcard indicating that the multicast stream can be received from any source. Using the example of FIG. 1, receiver 140A may generate an IGMPv2 join request 160A of "(*, 233.1.1.1)" and receiver 140B may generate an IGMPv3 join request 160B of "(10.1.1.1, 233.1.1.1)." In these examples, 10.1.1.1 is the IP address of source 150 and 233.1.1.1 is the multicast address.

SMET route message 170) is a message that contains a join request 160 from a receiver 140. In general, SMET route message 170) is communicated by a particular network device 120 to other network devices 120. For example, SMET route message 170A that is sent from network device 120A to network device 120D may be "(V2, *, 233.1.1.1)" and SMET route message 170B that is sent from network device 120C to network device 120D may be "(V3, 10.1.1.1, 233.1.1.1)." As illustrated in these examples, each SMET route message 170 may include an IGMP version number (i.e., "V2" or "V3") in addition to the join request 160 from receiver 140.

In operation, network devices 120 include an enhanced join handling procedure that converts IGMPv3 join requests 160 to IGMPv2 join requests 160 when the network device 120 is configured as an IGMPv2 querier. In the illustrated example of FIG. 1, for example, network device 120D, which is configured as an IGMPv2 querier and is configured to perform IGMP snooping, may receive SMET route message 170B that includes IGMPv3 join request 160B from receiver 140B that wishes to receive multicast traffic from source 150. Network device 120D may then convert IGMPv3 join request 160B to an IGMPv2 join request. Finally, network device 120D may send multicast traffic from source 150 to receiver 140B according to the converted IGMPv2 join request. As a result, receiver 150 that is located in an IGMPv3 instance 130C may be able to receive multicast traffic from source 150 that is in an IGMPv2 instance 130D where it would otherwise be unable to do so.

In some embodiments, each network device 120 includes a locally-stored database that may be used to store mapping states for the network device 120. For example, if network device 120D converts IGMPv3 join request 160B to an IGMPv2 join request, network device 120D may update a mapping state in its local database to include the conversion of the IGMPv3 join request 160B to the IGMPv2 join request. Using the example of FIG. 1, once SMET route message 170B is received at network device 120D from network device 120C, network device 120D may convert join request 160B of SMET route message 170B to an IGMPv2 join request and record the final state in its database as "(*, G), outgoing port: network device 120C."

As illustrated in FIG. 1, mixed IGMP querier network 100 may include network device 120A of instance 130A that is configured as an IGMPv2 querier. If receiver 140A in instance 130A also wants to receive multicast traffic from source 150, it will send join request 160A of (*, 233.1.1.1) to network device 120A. In turn, network device 120A will send SMET route message 170A of (V2, *, 233.1.1.1) to network device 120D. Once SMET route message 170A is received by network device 120D, network device 120D will not be required to convert join request 160A of SMET route message 170A to an IGMPv2 join request since it is already an IGMPv2 join request (i.e., join request 160A was generated by a receiver 140A in an IGMP instance 130A). Network device 120D may then send multicast traffic from source 150 to receiver 140A and may record the final state in is database as "(*, G), outgoing port: network device 120C, network device 120A."

In some embodiments, instead of a receiving IGMPv2 network device 120 converting a received IGMPv3 join request to an IGMPv2 join request, a transmitting IGMPv3 network device 120 may perform the conversion from IGMPv3 to IGMPv2. In these embodiments, network devices 120 may each advertise their IGMP querier capability along with a proxy feature. For example, each network device 120, when originating an IMET route with a proxy support bit, would include an additional flag which would indicate whether it is operating in IGMPv2 mode. In some embodiments, this flag would be enabled only if the querier version is V2. Once routes have been exchanged, each network device 120 will keep track of what version of querier are present in the network. For example, each network device 120 may maintain a table of peers and each of their associated querier versions. In the example of FIG. 1, for example, each network device 120 may maintain a table with information such as: "network device 120A: querier version 2: network device 120B: querier version 3; network device 120C: querier version 3: network device 120D: querier version 2." Then, when an IGMPv3 network device 120 such as network device 120C receives a join request 160B from receiver 140B, the network device 120 would consult the table to determine whether there are any network devices 120 operating in IGMPv2 mode. In the example of FIG. 1, network device 120C would determine that there are two peers (i.e., network devices 120A and 120D) that are operating in IGMPv2 mode and would therefore convert IGMPv3 join request 160B of (10.1.1.1, 233.1.1.1) to an IGMPv2 join request of (*, 233.1.1.1). SMET route message 170 would then become "(V2, *, 233.1.1.1)."

In the above example, since the same SMET route message 170B of "(V2, *, 233.1.1.1)" is sent to all peer network devices 120, all the multicast traffic for 233.1.1.1 would be sent to network device 120C if there are multiple sources 150 behind network device 120B. This is undesirable since network device 120C is interested only in one source (i.e., source 150). To eliminate this undesirable traffic, any IGMPv3 network device 120 that converts an IGMPv3 join request 160 to an IGMPv2 join request may indicate the conversion with an extra flag. This may allow other IGMPv3 network devices 120 to ignore the route and wait for an actual route to arrive. For example, when network device 120B receives the above SMET route message 170 of "(V2, *, 233.1.1.1)" (i.e., the IGMPv3 join request 160 that network device 120C converted to an IGMPv2 join request), network device 120B will know it was an auto generated route that can be ignored and therefore would not forward any traffic to the EVPN fabric.

Figure 2:
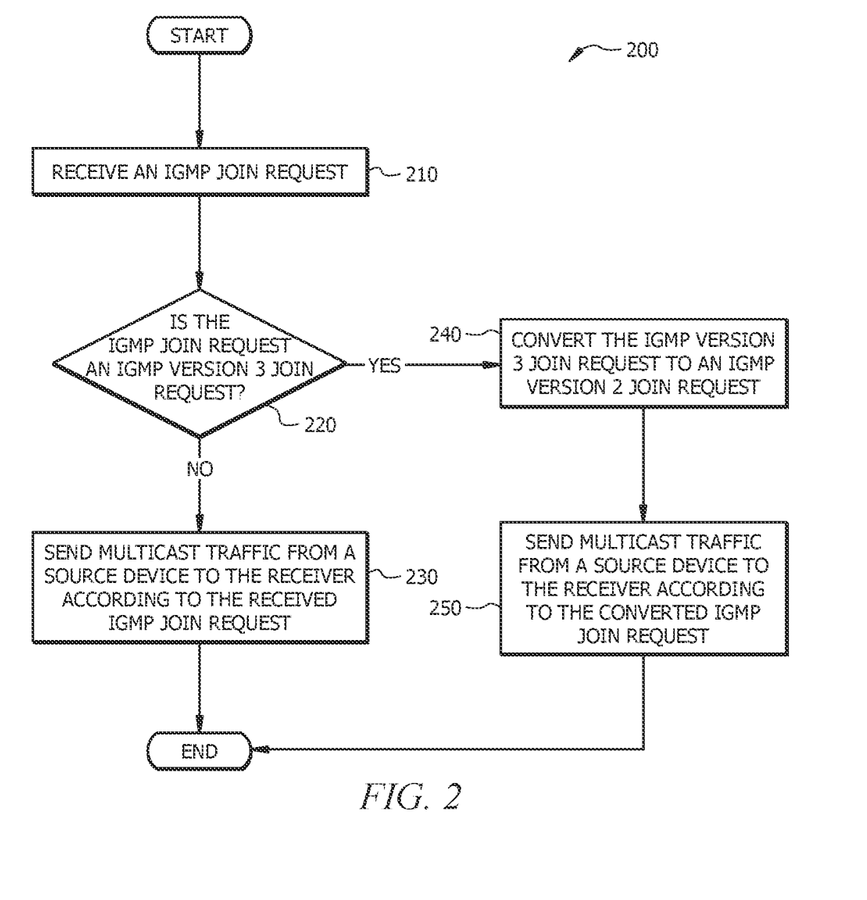
FIG. 2 is a flow diagram illustrating an example method by a network device in an EVPN to support mixed IGMP querier versions, according to some embodiments.

FIG. 2 is a flow diagram illustrating an example method 200 by a network device in an EVPN to support mixed IGMP querier versions. For example, method 200 may be performed by an IGMPv2 network device such as network device 120D of mixed IGMP querier network 100. Method 200 may begin in step 210 where method 200 receives an IGMP join request generated by a receiver. In some embodiments, the IGMP join request is join request 160. In some embodiments, the IGMP join request is in an SMET route message 170. In some embodiments the IGMP join request includes an address (e.g., an IP address) of a multicast source device such as source 150.

In step 220, method 200 determines whether the IGMP join request of step 210 is an IGMP version 3 join request. In some embodiments, step 220 may include comparing the information or format of the IGMP join request to standardized IGMPv2 and IGMPv3 join requests. (i.e., whether the IGMP join request includes a "*" that indicates an IGMPv2 join request). If method 200 in step 220 determines that the IGMP join request is an IGMP version 3 join request, method 200 proceeds to step 240. Otherwise, method 200 proceeds to step 230.

In step 230, method 200 sends multicast traffic from the multicast source device to the receiver according to the IGMP join request received in step 210. After step 230, method 200 may end.

In step 240, method 200 converts the IGMP join request received in step 210 to an IGMPv2 join request and proceeds to step 250. In step 250, method 200 sends multicast traffic from the multicast source device to the receiver according to the converted IGMP join request of step 240. After step 240, method 200 may end.

Figure 3:
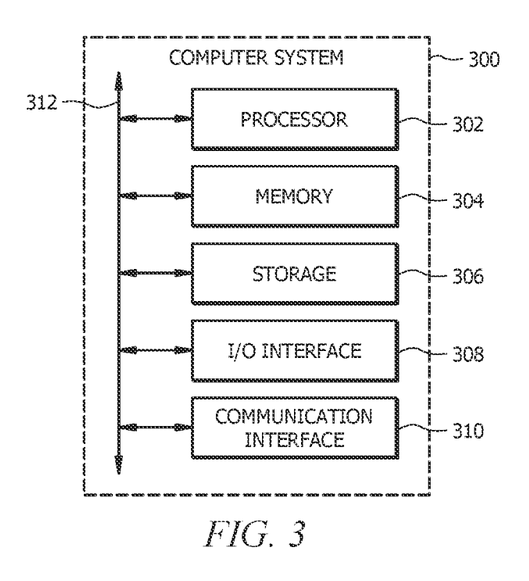
FIG. 3 is an example computer system that can be utilized to implement aspects of the various technologies presented herein, according to some embodiments.

FIG. 3 illustrates an example computer system 300. In particular embodiments, one or more computer systems 300 perform one or more steps of one or more methods described or illustrated herein. In particular embodiments, one or more computer systems 300 provide functionality described or illustrated herein. In particular embodiments, software running on one or more computer systems 300 performs one or more steps of one or more methods described or illustrated herein or provides functionality described or illustrated herein. Particular embodiments include one or more portions of one or more computer systems 300. Herein, reference to a computer system may encompass a computing device, and vice versa, where appropriate. Moreover, reference to a computer system may encompass one or more computer systems, where appropriate.

This disclosure contemplates any suitable number of computer systems 300. This disclosure contemplates computer system 300 taking any suitable physical form. As example and not by way of limitation, computer system 300 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, an augmented/virtual reality device, or a combination of two or more of these. Where appropriate, computer system 300 may include one or more computer systems 300: be unitary or distributed: span multiple locations: span multiple machines: span multiple data centers: or reside in a cloud, which may include one or more cloud components in one or more networks. Where appropriate, one or more computer systems 300 may perform without substantial spatial or temporal limitation one or more steps of one or more methods described or illustrated herein. As an example and not by way of limitation, one or more computer systems 300 may perform in real time or in batch mode one or more steps of one or more methods described or illustrated herein. One or more computer systems 300 may perform at different times or at different locations one or more steps of one or more methods described or illustrated herein, where appropriate.

In particular embodiments, computer system 300 includes a processor 302, memory 304, storage 306, an input/output (I/O) interface 308, a communication interface 310, and a bus 312. Although this disclosure describes and illustrates a particular computer system having a particular number of particular components in a particular arrangement, this disclosure contemplates any suitable computer system having any suitable number of any suitable components in any suitable arrangement.

In particular embodiments, processor 302 includes hardware for executing instructions, such as those making up a computer program. As an example and not by way of limitation, to execute instructions, processor 302 may retrieve (or fetch) the instructions from an internal register, an internal cache, memory 304, or storage 306; decode and execute them; and then write one or more results to an internal register, an internal cache, memory 304, or storage 306. In particular embodiments, processor 302 may include one or more internal caches for data, instructions, or addresses. This disclosure contemplates processor 302 including any suitable number of any suitable internal caches, where appropriate. As an example and not by way of limitation, processor 302 may include one or more instruction caches, one or more data caches, and one or more translation lookaside buffers (TLBs). Instructions in the instruction caches may be copies of instructions in memory 304 or storage 306, and the instruction caches may speed up retrieval of those instructions by processor 302. Data in the data caches may be copies of data in memory 304 or storage 306 for instructions executing at processor 302 to operate on: the results of previous instructions executed at processor 302 for access by subsequent instructions executing at processor 302 or for writing to memory 304 or storage 306: or other suitable data. The data caches may speed up read or write operations by processor 302. The TLBs may speed up virtual-address translation for processor 302. In particular embodiments, processor 302 may include one or more internal registers for data, instructions, or addresses. This disclosure contemplates processor 302 including any suitable number of any suitable internal registers, where appropriate. Where appropriate, processor 302 may include one or more arithmetic logic units (ALUs): be a multi-core processor: or include one or more processors 302. Although this disclosure describes and illustrates a particular processor, this disclosure contemplates any suitable processor.

In particular embodiments, memory 304 includes main memory for storing instructions for processor 302 to execute or data for processor 302 to operate on. As an example and not by way of limitation, computer system 300 may load instructions from storage 306 or another source (such as, for example, another computer system 300) to memory 304. Processor 302 may then load the instructions from memory 304 to an internal register or internal cache. To execute the instructions, processor 302 may retrieve the instructions from the internal register or internal cache and decode them. During or after execution of the instructions, processor 302 may write one or more results (which may be intermediate or final results) to the internal register or internal cache. Processor 302 may then write one or more of those results to memory 304. In particular embodiments, processor 302 executes only instructions in one or more internal registers or internal caches or in memory 304 (as opposed to storage 306 or elsewhere) and operates only on data in one or more internal registers or internal caches or in memory 304 (as opposed to storage 306 or elsewhere). One or more memory buses (which may each include an address bus and a data bus) may couple processor 302 to memory 304. Bus 312 may include one or more memory buses, as described below. In particular embodiments, one or more memory management units (MMUs) reside between processor 302 and memory 304 and facilitate accesses to memory 304 requested by processor 302. In particular embodiments, memory 304 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 304 may include one or more memories 304, where appropriate. Although this disclosure describes and illustrates particular memory, this disclosure contemplates any suitable memory.

In particular embodiments, storage 306 includes mass storage for data or instructions. As an example and not by way of limitation, storage 306 may include a hard disk drive (HDD), a floppy disk drive, flash memory, an optical disc, a magneto-optical disc, magnetic tape, or a Universal Serial Bus (USB) drive or a combination of two or more of these. Storage 306 may include removable or non-removable (or fixed) media, where appropriate. Storage 306 may be internal or external to computer system 300, where appropriate. In particular embodiments, storage 306 is non-volatile, solid-state memory. In particular embodiments, storage 306 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 306 taking any suitable physical form. Storage 306 may include one or more storage control units facilitating communication between processor 302 and storage 306, where appropriate. Where appropriate, storage 306 may include one or more storages 306. Although this disclosure describes and illustrates particular storage, this disclosure contemplates any suitable storage.

In particular embodiments, I/O interface 308 includes hardware, software, or both, providing one or more interfaces for communication between computer system 300 and one or more I/O devices. Computer system 300 may include one or more of these I/O devices, where appropriate. One or more of these I/O devices may enable communication between a person and computer system 300. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 308 for them. Where appropriate, I/O interface 308 may include one or more device or software drivers enabling processor 302 to drive one or more of these I/O devices. I/O interface 308 may include one or more I/O interfaces 308, where appropriate. Although this disclosure describes and illustrates a particular I/O interface, this disclosure contemplates any suitable I/O interface.

In particular embodiments, communication interface 310 includes hardware, software, or both providing one or more interfaces for communication (such as, for example, packet-based communication) between computer system 300 and one or more other computer systems 300 or one or more networks. As an example and not by way of limitation, communication interface 310 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 310 for it. As an example and not by way of limitation, computer system 300 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 300 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network, a Long-Term Evolution (LTE) network, or a 5G network), or other suitable wireless network or a combination of two or more of these. Computer system 300 may include any suitable communication interface 310 for any of these networks, where appropriate. Communication interface 310 may include one or more communication interfaces 310, where appropriate. Although this disclosure describes and illustrates a particular communication touch interface, this disclosure contemplates any suitable communication interface.

In particular embodiments, bus 312 includes hardware, software, or both coupling components of computer system 300 to each other. As an example and not by way of limitation, bus 312 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 312 may include one or more buses 312, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

The embodiments disclosed herein are only examples, and the scope of this disclosure is not limited to them. Particular embodiments may include all, some, or none of the components, elements, features, functions, operations, or steps of the embodiments disclosed herein. Certain embodiments are in particular disclosed in the attached claims directed to a method, a storage medium, a system and a computer program product, wherein any feature mentioned in one claim category, e.g. method, can be claimed in another claim category, e.g. system, as well. The dependencies or references back in the attached claims are chosen for formal reasons only. However, any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

The invention claimed is:

1. An Ethernet Virtual Private Network (EVPN) comprising:
   a first router configured as an Internet Group Management Protocol (IGMP) version 3 querier; and
   a second router configured as an IGMP version 2 querier, the second router configured to:
      receive a Selective Multicast Ethernet (SMET) route message generated by the first router, wherein:
         the SMET route message comprises an IGMP version 3 join request from a receiver behind the first router; and
         the IGMP version 3 join request comprises an address of a multicast source device behind the second router;
      convert the IGMP version 3 join request of the SMET route message to a first IGMP version 2 join request;
      update a mapping state to include the conversion of the IGMP version 3 join request of the SMET route message to the first IGMP version 2 join request; and
      send first multicast traffic from the multicast source device to the receiver via the first router.

2. The EVPN of claim 1, wherein the second router is further configured to perform IGMP snooping.

3. The EVPN of claim 1, wherein the second router is further configured to provide EVPN proxy functionality.

4. The EVPN of claim 1, further comprising a third router configured as an IGMP version 2 querier, wherein the second router is further configured to:
   receive a second SMET route message generated by the third router, wherein:
      the second SMET route message comprises a second IGMP version 2 join request from a second receiver behind the third router; and
      the second IGMP version 2 join request from the second receiver comprises the address of the multicast source device; and
   send second multicast traffic from the multicast source device to the second receiver via the third router.

5. The EVPN of claim 1, wherein the conversion of the IGMP version 3 join request of the SMET route message to the first IGMP version 2 join request is stored in a local database.

6. A method performed by a network device in an Ethernet Virtual Private Network (EVPN), the method comprising:
   receiving an Internet Group Management Protocol (IGMP) version 3 join request generated by a receiver, the IGMP version 3 join request comprising an address of a multicast source device;
   converting the IGMP version 3 join request to an IGMP version 2 join request;
   updating a mapping state to include the conversion of the IGMP version 3 join request of a SMET route message to the IGMP version 2 join request; and
   sending multicast traffic from the multicast source device to the receiver.

7. The method of claim 6, wherein:
   the network device is a first router; and
   the first router is configured as an Internet Group Management Protocol (IGMP) version 2 querier.

8. The method of claim 7, wherein:
   the IGMP version 3 join request is generated by a second router; and
   the second router is configured as an IGMP version 3 querier.

9. The method of claim 6, wherein the IGMP version 3 join request is received via a Selective Multicast Ethernet (SMET) route message.

10. The method of claim 6, further comprising enabling IGMP snooping on the network device.

11. The method of claim 6, further comprising enabling EVPN proxy functionality on the network device.

12. The method of claim 6, wherein the conversion of the IGMP version 3 join request to the IGMP version 2 join request is stored in a local database of the network device.

13. One or more computer-readable non-transitory storage media embodying instructions that, when executed by a processor, cause performance of operations comprising:
   receiving an Internet Group Management Protocol (IGMP) join request generated by a receiver, the IGMP join request comprising an address of a multicast source device;
   determining whether the IGMP join request is an IGMP version 3 join request;
   in response to determining that the IGMP join request is an IGMP version 3 join request, converting the IGMP version 3 join request to a first IGMP version 2 join request;
   updating a mapping state to include the conversion of the IGMP version 3 join request of a SMET route message to the first IGMP version 2 join request; and
   sending first multicast traffic from the multicast source device to the receiver.

14. The one or more computer-readable non-transitory storage media claim 13, wherein:
   the processor is within a first router; and
   the first router is configured as an Internet Group Management Protocol (IGMP) version 2 querier.

15. The one or more computer-readable non-transitory storage media claim 14, wherein:
   the IGMP join request is sent by a second router; and
   the second router is configured as an IGMP version 3 querier.

16. The one or more computer-readable non-transitory storage media claim 13, wherein the IGMP version 3 join request is received via a Selective Multicast Ethernet (SMET) route message.

17. The one or more computer-readable non-transitory storage media claim 13, the operations further comprising enabling IGMP snooping.

18. The one or more computer-readable non-transitory storage media claim 13, the operations further comprising enabling EVPN proxy functionality.

19. The one or more computer-readable non-transitory storage media of claim 13, wherein the conversion of the IGMP version 3 join request to the first IGMP version 2 join request is stored in a local database.

20. The one or more computer-readable non-transitory storage media of claim 13, the operations further comprising:

receiving a second IGMP version 2 join request generated by a second receiver, the second IGMP version 2 join request comprising the address of the multicast source device; and sending second multicast traffic from the multicast source device to the second receiver.

* * * * *